United States Patent
Zhang et al.

(10) Patent No.: US 11,432,200 B2
(45) Date of Patent: Aug. 30, 2022

(54) BANDWIDTH ADJUSTMENT METHOD, MOBILE TERMINAL, NETWORK SIDE DEVICE, AND MEDIUM

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 25 days.

(21) Appl. No.: 17/129,431

(22) Filed: Dec. 21, 2020

(65) Prior Publication Data

US 2021/0112457 A1    Apr. 15, 2021

Related U.S. Application Data

(63) Continuation of application No. PCT/CN2019/091217, filed on Jun. 14, 2019.

(30) Foreign Application Priority Data

Jun. 20, 2018  (CN) .......................... 201810639868.4

(51) Int. Cl.
  *H04W 28/00*    (2009.01)
  *H04W 28/20*    (2009.01)
(52) U.S. Cl.
  CPC .................................. *H04W 28/20* (2013.01)
(58) Field of Classification Search
  None
  See application file for complete search history.

(56) References Cited

U.S. PATENT DOCUMENTS

| 7,519,916 B1* | 4/2009 | Hartwell | H04N 21/44209 725/95 |
| 2018/0288746 A1* | 10/2018 | Zhang | H04L 5/0048 |
| 2019/0082431 A1* | 3/2019 | Yi | H04W 72/042 |
| 2019/0132824 A1* | 5/2019 | Jeon | H04L 5/0092 |
| 2019/0200396 A1* | 6/2019 | Agiwal | H04W 74/0833 |
| 2019/0253531 A1* | 8/2019 | Basu Mallick | H04W 28/20 |
| 2019/0327769 A1* | 10/2019 | Yang | H04W 76/19 |

(Continued)

FOREIGN PATENT DOCUMENTS

| WO | 2018075828 A1 | 4/2018 |
| WO | 2018084544 A1 | 5/2018 |
| WO | 2018085145 A1 | 5/2018 |

OTHER PUBLICATIONS

Chinese Office Action dated Sep. 3, 2020 as received in application No. 201810639868.4.

(Continued)

*Primary Examiner* — Robert C Scheibel
*Assistant Examiner* — Gautam Sharma
(74) *Attorney, Agent, or Firm* — Maschoff Brennan

(57) ABSTRACT

A bandwidth adjustment method, a mobile terminal, a network side device, and a computer storage medium are provided in the present disclosure. The bandwidth adjustment method includes: deactivating a currently activated bandwidth part BWP based on a deactivation condition, and switching to a pre-configured default BWP; where the currently activated BWP includes a to-be-adjusted BWP in the currently activated BWP.

20 Claims, 3 Drawing Sheets

(56) References Cited

U.S. PATENT DOCUMENTS

| | | | |
|---|---|---|---|
| 2020/0314816 A1* | 10/2020 | Yi | H04W 72/042 |
| 2020/0367107 A1* | 11/2020 | Shen | H04W 72/042 |
| 2021/0084619 A1* | 3/2021 | Li | H04W 72/04 |
| 2021/0112457 A1* | 4/2021 | Zhang | H04L 5/001 |

OTHER PUBLICATIONS

Chinese Office Action dated Jan. 13, 2021 as received in application No. 201810639868.4.
"Remaining details for bandwidth part operation" 3GPP TSG RAN WG1 NR AH#3 R1-1715648, Nagoya, Japan, Sep. 18-21, 2017, Vivo Mobile.
"Remaining details for bandwidth part operation" 3GPP TSG RAN WG1 Meeting 90bis R1-1717504, Prague, CZ, Oct. 9-13, 2017, Vivo Mobile.
"Bandwidth part activation and adaptation" 3GPP TSG RAN WG1 Meeting #91 R1-1719828, Reno, USA, Nov. 27-Dec. 1, 2017, Huawei.
EP Office Action in Application No. 19822910.6 dated Jul. 20, 2021.
"Bandwidth part activation and adaptation" 3GPP TSG RAN WG1 Meeting #90bis, Huawei, HiSilicon, R1-1717905, Oct. 9, 2017.
"Fallback mechanism for Bandwidth part operation" 3GPP TSG-RAN WG2 Meeting #99, MediaTek Inc., R2-1708045, Aug. 21, 2017.
"Framework to support bandwidth parts in NR" 3GPP TSG-RAN WG2 NR #99bis Meeting, Samsung, R2-1711187, Oct. 9, 2017.
"Activation/deactivation of bandwidth parts in NR" 3GPP TSG-RAN WG2 NR #99bis Meeting, Samsung, R2-1711189, Oct. 9, 2017.

\* cited by examiner

BANDWIDTH ADJUSTMENT METHOD, MOBILE TERMINAL, NETWORK SIDE DEVICE, AND MEDIUM

CROSS REFERENCE TO RELATED APPLICATIONS

This application is a continuation application of International Application No. PCT/CN2019/091217 filed on Jun. 14, 2019, which claims priority to Chinese patent application No. 201810639868.4 filed in China on Jun. 20, 2018, which is incorporated herein by reference in its entirety.

TECHNICAL FIELD

The present disclosure relates to the communications field, and in particular, to a bandwidth adjustment method, a mobile terminal, a network side device, and a computer storage medium.

BACKGROUND

In a new radio access technology (new radio access technology, NR) system of a fifth-generation (The 5th Generation mobile communication, 5G) communications system, a cell supports system bandwidth of a maximum of 400 MHz (MHz), which is far greater than system bandwidth of a maximum of 20 MHz of Long Term Evolution (Long Term Evolution, LTE), to support a larger system and user throughput.

However, supporting such high system bandwidth is a great challenge to implementation of user equipment (User Equipment, UE). Therefore, the 5G NR system also supports dynamic and flexible bandwidth allocation, and the system bandwidth is divided into a plurality of bandwidth parts (Bandwidth Part, BWP), to support access of a narrow-band terminal or a UE in an energy-saving mode.

The UE supports only one activated BWP. A 5G base station (gNB) sends data to the UE based on the activated BWP. When a timer corresponding to the activated BWP expires, the UE deactivates the activated BWP and switches to a default BWP. With technology evolution, when a plurality of BWPs are simultaneously activated for one UE, the UE needs to deactivate the activated BWPs and switch to default BWPs, to release bandwidth resources. Therefore, there is a problem of how to switch the UE to the default BWPs to use the bandwidth resources properly.

SUMMARY

According to a first aspect, an embodiment of the present disclosure provides a bandwidth adjustment method, including:

deactivating a currently activated bandwidth part BWP based on a deactivation condition, and switching to a pre-configured default BWP; where the currently activated BWP includes a to-be-adjusted BWP in the currently activated BWP.

According to a second aspect, an embodiment of the present disclosure further provides a bandwidth adjustment method, including:

sending configuration information of a default bandwidth part BWP to user equipment UE; and sending a BWP-based activation/deactivation instruction to the UE, to control the UE to deactivate a currently activated BWP and switch to the default BWP, where the currently activated BWP includes a to-be-adjusted BWP in the currently activated bandwidth part BWP.

According to a third aspect, an embodiment of the present disclosure further provides a mobile terminal, including:

a control module, configured to deactivate a currently activated BWP based on a deactivation condition, where the currently activated BWP includes a to-be-adjusted BWP in the currently activated BWP; and a switching module, configured to autonomously switch to a pre-configured default BWP.

According to a fourth aspect, an embodiment of the present disclosure further provides a network side device, including:

a configuration module, configured to send configuration information of a default bandwidth part BWP to user equipment UE; and an instruction module, configured to send a BWP-based activation/deactivation instruction to the UE, to control the UE to deactivate a currently activated BWP and switch to the default BWP, where the currently activated BWP includes a to-be-adjusted BWP in the currently activated BWP.

According to a fifth aspect, an embodiment of the present disclosure further provides a mobile terminal, including:

a memory, configured to store a program; and a processor, configured to run the program stored in the memory, to perform the foregoing bandwidth adjustment method.

According to a sixth aspect, an embodiment of the present disclosure further provides a network side device, including:

a memory, configured to store a program; and a processor, configured to run the program stored in the memory, to perform the foregoing bandwidth adjustment method.

According to a seventh aspect, an embodiment of the present disclosure further provides a computer-readable storage medium that stores a computer program instruction, and when the computer program instruction is executed by a processor, the foregoing bandwidth adjustment method is implemented.

BRIEF DESCRIPTION OF DRAWINGS

It may be better understood from the following descriptions of specific implementations of the present disclosure with reference to the accompanying drawings that same or similar reference numerals represent same or similar features in the present disclosure.

DESCRIPTION OF EMBODIMENTS

To make the objectives, technical solutions, and advantages of the present disclosure clearer, the following further describes the present disclosure in detail with reference to the accompanying drawings and specific embodiments.

Minimum bandwidth of 5G may be 5 MHz, and maximum bandwidth can reach 400 MHz. If all UEs are required to support the maximum 400 MHz, a relatively high requirement is undoubtedly put forward for performance of the UEs. This is not conducive to reduction of UE costs. In addition, one UE cannot occupy the entire 400 M bandwidth at the same time. If the UE uses a sampling rate corresponding to the 400 M bandwidth, the bandwidth is undoubtedly wasted.

In a 5G NR system, bandwidth of the UE may dynamically change. At a first moment, a service volume of the UE is relatively large, and a network side device configures large bandwidth BWP1 for the UE. At a second moment, a service volume of the UE is relatively small, and the network side device configures small bandwidth BWP2 for the UE, to meet a basic communication requirement. At a third moment, the network side device finds that resources in a frequency range in which BWP1 is located are in short supply, and therefore configures new bandwidth (BWP3) for the UE.

An NR cell also supports configuration of different resources on different bandwidths. If the UE cannot support all resources of the cell, when the BWP is configured for the UE, a frequency band corresponding to an unsupported resource is not configured for the UE.

The network side device may configure a BWP set available to each cell for the UE, and may dynamically switch a BWP that needs to be started, in other words, deactivating an activated BWP while activating a BWP.

Currently, the UE supports only one activated BWP, and the UE deactivates the activated BWP and switches to a default BWP. With technology evolution, a plurality of BWPs may be simultaneously activated for one UE, and therefore, there is a problem of how to switch the UE to a default BWP to use bandwidth resources properly.

Figure 1:
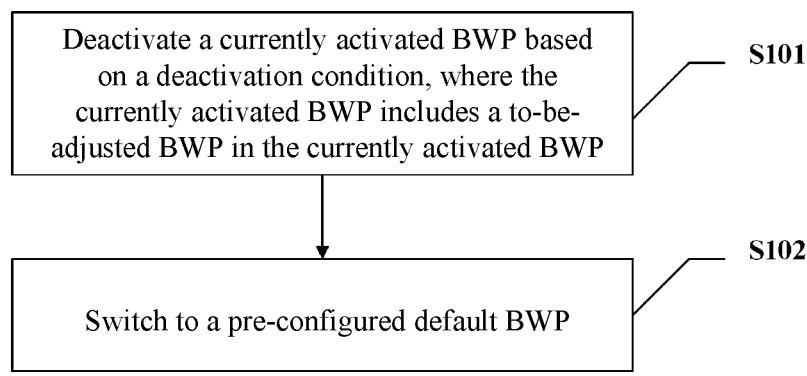
FIG. 1 is a schematic flowchart of a bandwidth adjustment method according to an embodiment of the present disclosure.

FIG. 1 is a schematic flowchart of a bandwidth adjustment method according to an embodiment of the present disclosure. An execution body in FIG. 1 may be a UE.

S101: Deactivate a currently activated BWP based on a deactivation condition, where the currently activated BWP includes a to-be-adjusted BWP in the currently activated BWP.

A plurality of BWPs may be simultaneously activated for one UE, in other words, there is more than one activated BWP for one UE. The plurality of BWPs are configured by a network side device based on a traffic volume of the UE. It should be noted that the deactivation condition may include a BWP activation/deactivation instruction, or that a timer of an activated BWP expires.

Considering that the UE may have a plurality of activated BWPs at the same time, the network side device may trigger, by sending the BWP activation/deactivation instruction, the UE to perform deactivation. As an example, a Media Access Control (Media Access Control, MAC) control element (control element, CE) is control signaling of a MAC layer.

The BWP activation/deactivation instruction may include a BWP activation (activation)/deactivation (deactivation) MAC CE. In other words, the BWP deactivation instruction may include a deactivated BWP, and may further include an activated BWP. The deactivated BWP is a to-be-deactivated BWP, and the activated BWP is a to-be-activated BWP.

When the BWP deactivation instruction includes both the deactivated BWP and the activated BWP, a UE that receives the BWP deactivation instruction needs to deactivate the to-be-deactivated BWP and activate the to-be-activated BWP.

Each activated BWP corresponds to one timer, and the timer may be a BWP-inactive timer (bwp-inactive Timer). When a timer of the activated BWP expires, it indicates that an idle time of the activated BWP corresponding to the timer expires, and it indicates that the activated BWP is not used by the UE. To properly use bandwidth resources, deactivation needs to be performed.

When a plurality of BWPs are simultaneously activated for one UE, each activated BWP corresponds to one timer. When a timer of an activated BWP expires, deactivation needs to be performed. In other words, in timers corresponding to a plurality of activated BWPs, once a timer expires, the UE needs to perform deactivation.

Based on the BWP activation/deactivation instruction, or when a timer of an activated BWP expires, the UE may deactivate a currently activated BWP. In other words, the deactivated BWP needs to meet two conditions at the same time. Condition 1 is that the deactivated BWP is an activated BWP. Condition 2 is that the deactivated BWP is a to-be-adjusted BWP. In other words, the currently activated BWP includes a to-be-adjusted BWP in the currently activated BWP. It should be noted that the to-be-adjusted BWP is a BWP that needs to be adjusted and that is determined based on a current bandwidth resource.

S102: Switch to a pre-configured default BWP.

The UE deactivates the currently activated BWP and can autonomously switch to the pre-configured default BWP. In other words, after the UE deactivates the currently activated BWP, the UE can autonomously switch to the pre-configured default BWP without another triggering condition.

The default BWP is a BWP that is configured based on the UE. In other words, each UE may configure a default BWP. Certainly, the default BWP of each UE may be the same or different.

In this embodiment of the present disclosure, the currently activated BWP is first deactivated based on the deactivation condition, in other words, use of the currently activated BWP is stopped, to release some bandwidth resources. Then, the UE switches to the pre-configured default BWP. When a plurality of BWPs are simultaneously activated for one UE, the currently activated BWP is deactivated, and bandwidth resources are released for another user to use, to use the bandwidth resources properly.

In some embodiments of the present disclosure, when the deactivation condition includes the BWP activation/deactivation instruction, the to-be-adjusted BWP may include a BWP corresponding to the activation/deactivation instruction, and the corresponding BWP includes all currently activated BWPs. In other words, the deactivated BWP is a deactivated BWP corresponding to the activation/deactivation instruction, and because the corresponding deactivated BWP is all the currently activated BWPs, there is currently no activated BWP after the corresponding deactivated BWP is deactivated. As an example, deactivated BWPs corresponding to the activation/deactivation instruction are BWP1 and BWP2, and BWP1 and BWP2 are all the currently activated BWPs. To-be-adjusted BWPs include BWP1 and BWP2. After the UE deactivates BWP1 and BWP2 based on the activation/deactivation instruction, there is currently no activated BWP.

In addition, when the deactivation condition includes a timer of an activated BWP, the currently activated BWP may include a BWP corresponding to the timer of the activated BWP, and the corresponding BWP is the only currently activated BWP. In other words, the deactivated BWP is the BWP corresponding to the timer of the activated BWP, and because the corresponding BWP is the only currently activated BWP, there is currently no activated BWP after the corresponding BWP is deactivated. As an example, a BWP corresponding to a timer of an activated BWP is BWP2, and BWP2 is the only currently activated BWP. The to-be-adjusted BWP includes BWP2. After the UE deactivates BWP2 based on the activation/deactivation instruction, there is currently no activated BWP.

In this embodiment of the present disclosure, a terminal may deactivate, based on the BWP activation/deactivation instruction or being triggered when a timer of an activated BWP expires, the BWP corresponding to the activation/deactivation instruction, or a BWP corresponding to the timer, so that bandwidth resources are purposefully and properly used.

In some embodiments of the present disclosure, the currently activated BWP includes a plurality of activated BWPs. A quantity of currently activated BWPs is greater than a quantity of BWPs corresponding to an expired timer. In other words, the BWP corresponding to the expired timer is not the last activated BWP. In addition to the BWP corresponding to the expired timer, there are other activated BWP. When a timer of an activated BWP expires, it indicates that the currently activated BWP needs to be deactivated. The BWP corresponding to the expired timer may be used as the to-be-adjusted BWP. The other activated BWPs are not deactivated. After the currently activated BWP is deactivated, the UE does not need to switch to the default BWP, so that the UE may continue to use the other activated BWPs, which does not affect that the UE continues to use the other activated BWPs.

The currently activated BWP includes a plurality of activated BWPs. If the quantity of currently activated BWPs is equal to the quantity of BWPs corresponding to the expired timer, the currently activated BWP is deactivated and switched to the default BWP.

As an example, currently activated BWPs include BWP1, BWP2, and BWP3. When a timer of BWP1 expires, BWP1 is used as the to-be-adjusted BWP, the UE deactivates only BWP1 and does not deactivate BWP2 and BWP3, and the UE does not switch to the default BWP. In other words, BWP1 is deactivated purposefully, other activated BWPs are not affected, and the UE may further continue to use BWP2 and BWP3. In this way, impact on other activated BWPs is minimized while the bandwidth resources are used properly.

In some embodiments of the present disclosure, the currently activated BWP includes a plurality of activated BWPs. The activation/deactivation instruction includes a to-be-activated BWP and a to-be-deactivated BWP. In other words, based on the activation/deactivation instruction, the UE not only needs to deactivate the to-be-deactivated BWP, but also needs to activate the to-be-activated BWP.

When a sum of a quantity of currently activated BWPs and a quantity of to-be-activated BWPs in the activation/deactivation instruction is greater than a quantity of to-be-deactivated BWPs in the activation/deactivation instruction, after the UE deactivates the to-be-deactivated BWP, the quantity of currently activated BWPs is not 0. Therefore, the to-be-deactivated BWP in the activation/deactivation instruction may be used as the to-be-adjusted BWP. The other activated BWPs are not deactivated. For the UE, after the to-be-deactivated BWP is deactivated, the to-be-activated BWP is activated, and the UE does not need to switch to the default BWP, so that the UE may continue to use the other activated BWPs, which does not affect that the UE continues to use the other activated BWPs.

When the sum of the quantity of currently activated BWPs and the quantity of to-be-activated BWPs in the activation/deactivation instruction is equal to the quantity of to-be-deactivated BWPs in the activation/deactivation instruction, after the UE deactivates the to-be-deactivated BWP, the quantity of currently activated BWPs is 0. The currently activated BWP may be used as the to-be-adjusted BWP. The currently activated BWP is deactivated and the UE switches to the pre-configured default BWP.

As an example, currently activated BWPs include BWP1, BWP2, BWP3, and BWP4. The activation/deactivation instruction includes a to-be-activated BWP and a to-be-deactivated BWP, the to-be-activated BWP includes BWP5, and the to-be-deactivated BWP includes BWP3. The quantity of currently activated BWPs is 4, the quantity of to-be-activated BWPs in the activation/deactivation instruction is 1, and the quantity of to-be-deactivated BWPs in the activation/deactivation instruction is 1. Apparently, the sum of the quantity of currently activated BWPs and the quantity of to-be-activated BWPs in the activation/deactivation instruction is greater than the quantity of to-be-deactivated BWPs in the activation/deactivation instruction. The UE receives the activation/deactivation instruction. If BWP3 is used as the to-be-adjusted BWP, the UE activates BWP5 after deactivating BWP3. BWP1, BWP2, and BWP4 are not deactivated, and the UE does not switch to the default BWP. In other words, BWP3 is deactivated purposefully, other activated BWPs are not affected, and the UE may further continue to use BWP1, BWP2, and BWP4. In this way, impact on other activated BWPs is minimized while the bandwidth resources are used properly.

In some embodiments of the present disclosure, the deactivation condition includes a BWP activation/deactivation instruction, or that a timer of an activated BWP expires. For the BWP activation/deactivation instruction, or when a timer of an activated BWP expires, a BWP corresponding to the BWP activation/deactivation instruction is deactivated, or a BWP corresponding to the expired timer is deactivated, and then the UE switches to the default BWP. In other words, the to-be-adjusted BWP includes the BWP activation/deactivation instruction or the BWP corresponding to the expired timer, and does not include other activated BWPs. When there are a plurality of BWPs for the UE, the UE switches from an activated BWP to the default BWP, to adjust bandwidth resources of the UE and use the bandwidth resources properly.

As an example, currently activated BWPs include BWP1 and BWP2. When the UE receives a BWP1 activation/deactivation instruction, or when a timer of BWP1 expires, only BWP1 is used as the to-be-adjusted BWP, and the UE deactivates only BWP1, and does not deactivate BWP2.

In some embodiments of the present disclosure, the deactivation condition includes that a timer of an activated BWP expires. If the timer of the activated BWP expires, all currently activated BWPs are deactivated, and then the UE switches to the default BWP. When bandwidth resources are in short supply, once a timer of an activated BWP expires, it indicates that bandwidth resources of the UE are in short supply. To ease bandwidth resource tension, all the currently activated BWPs are deactivated. In other words, the to-be-adjusted BWP includes all the currently activated BWPs.

As an example, the currently activated BWPs include BWP1, BWP2, BWP3, and BWP4. When bandwidth resources are in short supply, if a timer of BWP1 expires, the UE deactivates all the currently activated BWPs, that is, deactivates BWP1, BWP2, BWP3, and BWP4.

In some embodiments of the present disclosure, the deactivation condition includes that a timer of an activated BWP expires. If the timer of the activated BWP expires, all the currently activated BWPs that do not carry a preset service are deactivated, and then the UE switches to the default BWP. The activated BWPs carry different services. To ensure stability of the preset service, all the currently activated BWPs that do not carry the preset service may be deactivated. In other words, the to-be-adjusted BWP includes a currently activated BWP that does not carry the preset service. As an example, the preset service may include a high-reliability and low-latency communication (High Reliable & Low Latency Communication, HRLLC) service and/or an ultra-high-reliability and ultra-low-latency communication (Ultra Reliable & Low Latency Communication, URLLC) service.

As an example, currently activated BWPs include BWP1, BWP2, and BWP3. If BWP2 carries the preset service, and a timer of BWP1 expires, the UE deactivates all currently activated BWPs that do not carry the preset service, that is, deactivates BWP1 and BWP3.

Figure 2:
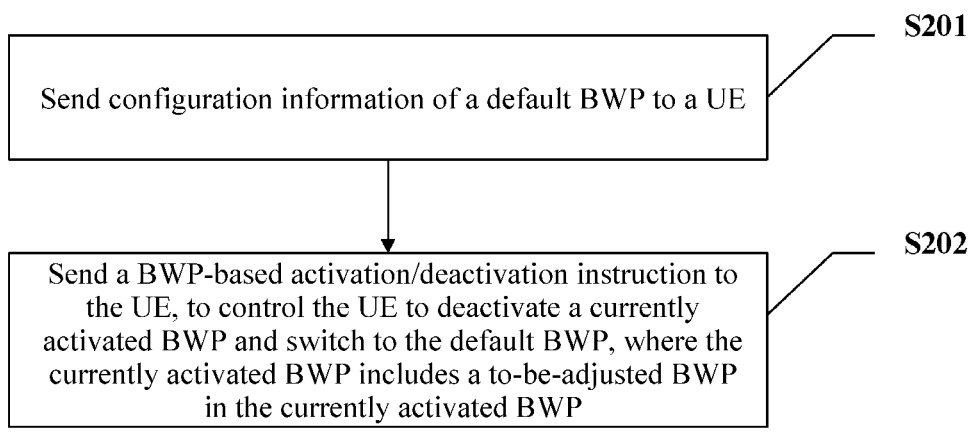
FIG. 2 is another schematic flowchart of a bandwidth adjustment method according to an embodiment of the present disclosure.

FIG. 2 is a schematic flowchart of a bandwidth adjustment method according to some other embodiments of the present disclosure. In FIG. 2, an execution body may be a network side device. As an example, the network side device may be a 5G base station (gNB).

S201: Send configuration information of a default BWP to a UE.

When a plurality of BWPs are simultaneously activated for one UE, the UE switches to the default BWP.

Considering that the UE is configured with a plurality of serving cells, for example, a plurality of secondary cells (Secondary cell, Scell), one or more default BWPs may be configured for the UE by using a serving cell of the UE as a unit. In other words, the default BWP is one or more BWPs that are configured for the UE based on the serving cell of the UE. In other words, each serving cell (per serving cell) configures one or more default BWPs for the UE. As an example, for a plurality of different serving cells of the UE, the different serving cells may configure different default BWPs. In addition, the default BWP may be configured for each UE (perUE).

The network side device may configure the default BWP by using a system message, a dedicated Radio Resource Control (Radio Resource Control, RRC) message, or an RRC reconfiguration message.

The system message may configure the default BWP through broadcasting. For each UE, the default BWP does not need to be configured by sending signaling separately, thereby saving bandwidth resources.

The default BWP may also be configured for the UE by using the dedicated RRC message. In this way, specific configuration may be performed for different UEs.

In addition, when sending the RRC reconfiguration message to the UE, the network side device may configure the default BWP in the RRC reconfiguration message. In this way, a message does not need to be separately sent to the UE to configure the default BWP, thereby reducing signaling overheads. As an example, the RRC reconfiguration message includes one of the following messages: a Scell addition (addition) message, a Scell modification (modification) message, a Scell change (change) message, a secondary cell group (secondary cell group, SCG) addition message, an SCG modification message, and an SCG change message.

S202: Send a BWP-based activation/deactivation instruction to the UE, to control the UE to deactivate a currently activated BWP and switch to the default BWP, where the currently activated BWP includes a to-be-adjusted BWP in the currently activated BWP.

A purpose of sending, by the network side device, the BWP activation/deactivation instruction to the UE based on the BWP-based activation/deactivation instruction is to control the UE to deactivate the currently activated BWP. The currently activated BWP includes the to-be-adjusted BWP in the currently activated BWP.

It should be noted that the network side device configures a plurality of default BWPs for the UE. When falling back to the default BWP, the UE may select the default BWP in the following manners.

Manner 1: The UE randomly selects the default BWP from the plurality of default BWPs.

Manner 2: When a timer of an activated BWP expires, a default BWP of a serving cell in which a BWP corresponding to the expired timer is located may be used as the default BWP of the UE.

Manner 3: Select the default BWP according to a pre-configured rule. As an example, the pre-configured rule includes: selecting a maximum default BWP in current default BWPs, and the maximum default BWP in the current default BWPs is selected to reserve maximum bandwidth for the UE. In addition, the pre-configured rule may further include: selecting a minimum default BWP in the current default BWsP, and the minimum default BWP in the current default BWPs is selected to provide as much bandwidth as possible for a network for another user to use.

Figure 3:
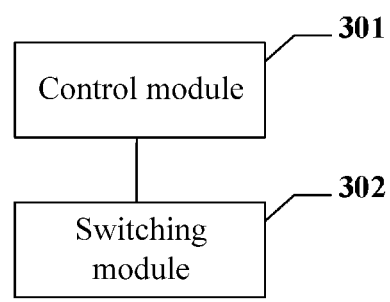
FIG. 3 is a schematic diagram of an apparatus structure of a mobile terminal according to an embodiment of the present disclosure.

FIG. 3 is a schematic diagram of an apparatus structure of a mobile terminal according to an embodiment of the present disclosure. The mobile terminal corresponds to the bandwidth adjustment method, and the mobile terminal specifically includes:

a control module 301, configured to deactivate a currently activated BWP based on a deactivation condition, where the currently activated BWP includes a to-be-adjusted BWP in the currently activated BWP; and a switching module 302, configured to switch to a pre-configured default BWP.

In some embodiments of the present disclosure, the deactivation condition includes a BWP activation/deactivation instruction, or that a timer of an activated BWP expires.

In some embodiments of the present disclosure, the to-be-adjusted BWP includes a BWP corresponding to the deactivation condition, and the corresponding BWP includes all currently activated BWPs.

In some embodiments of the present disclosure, the activation condition includes that a timer of an activated BWP expires, and the control module 301 is further configured to deactivate the currently activated BWP if a quantity of currently activated BWPs is equal to a quantity of BWPs corresponding to the timer.

The switching module 302 is configured to switch to the pre-configured default BWP.

The control module 301 is further configured to deactivate the corresponding BWP if the quantity of currently activated BWPs is greater than the quantity of BWPs corresponding to the timer.

In some embodiments of the present disclosure, the deactivation condition includes a BWP-based activation/deactivation instruction, and the control module 301 is further configured to deactivate the currently activated BWP if a sum of a quantity of currently activated BWPs and a quantity of to-be-activated BWPs in the activation/deactivation instruction is equal to a quantity of to-be-deactivated BWPs in the activation/deactivation instruction.

The switching module 302 is configured to switch to the pre-configured default BWP.

The control module 301 is further configured to: based on the BWP activation/deactivation instruction, if the sum of the quantity of currently activated BWPs and the quantity of to-be-activated BWPs in the activation/deactivation instruction is greater than the quantity of to-be-deactivated BWPs in the activation/deactivation instruction, deactivate the to-be-deactivated BWPs, and activate the to-be-activated BWPs.

In some embodiments of the present disclosure, the to-be-adjusted BWP includes the BWP corresponding to the deactivation condition, and the deactivation condition includes a BWP activation/deactivation instruction, or that a timer of an activated BWP expires.

In some embodiments of the present disclosure, the deactivation condition includes that a timer of an activated BWP expires, and the to-be-adjusted BWP includes all currently activated BWPs;

or, the deactivation condition includes that a timer of an activated BWP expires, and the to-be-adjusted BWP includes a currently activated BWP that does not carry a preset service.

In some embodiments of the present disclosure, the default BWP is a BWP that is configured based on UE, or the default BWP is one or more BWPs configured for the UE based on a serving cell of the UE.

In some embodiments of the present disclosure, the default BWP is configured by using a system message, a dedicated RRC message, or an RRC reconfiguration message.

In some embodiments of the present disclosure, the RRC reconfiguration message includes one of the following messages: a secondary cell addition message, a secondary cell modification message, a secondary cell change message, a secondary cell group addition message, a secondary cell group modification message, and a secondary cell group change message.

In some embodiments of this disclosure, the default BWP is a randomly selected default BWP, a default BWP of a serving cell in which a BWP corresponding to an expired timer is located, or a default BWP selected according to a pre-configured rule.

In some embodiments of this disclosure, the pre-configured default BWP includes selecting a maximum default BWP in current default BWPs or selecting a minimum default BWP in current default BWPs.

Figure 4:
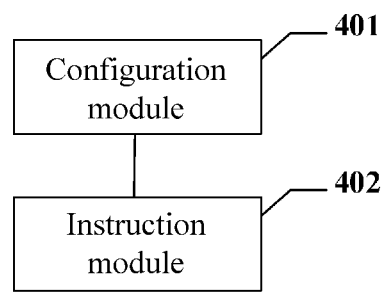
FIG. 4 is a schematic structural diagram of a network side device according to an embodiment of the present disclosure.

FIG. 4 is a schematic structural diagram of a network side device according to an embodiment of the present disclosure. The network side device corresponds to the bandwidth adjustment method, and the network side device specifically includes:

a configuration module 401, configured to send configuration information of a default BWP to a UE; and an instruction module 402, configured to send a BWP-based activation/deactivation instruction to the UE, to control the UE to deactivate a currently activated BWP and switch to the default BWP, where the currently activated BWP includes a to-be-adjusted BWP in the currently activated BWP.

In some embodiments of the present disclosure, the to-be-adjusted BWP includes a BWP corresponding to the activation/deactivation instruction, and the corresponding BWP includes all currently activated BWPs.

In some embodiments of the present disclosure, the instruction module 402 is further configured to: if a sum of a quantity of currently activated BWPs and a quantity of to-be-activated BWPs in the activation/deactivation instruction is equal to a quantity of to-be-deactivated BWPs in the activation/deactivation instruction, control the UE to deactivate the currently activated BWP and switch to the default BWP; and send a BWP-based activation/deactivation instruction to the UE, and if the sum of the quantity of currently activated BWPs and the quantity of to-be-activated BWPs in the activation/deactivation instruction is greater than the quantity of to-be-deactivated BWPs in the activation/deactivation instruction, control the UE to deactivate the to-be-deactivated BWPs and activate the to-be-activated BWPs.

In some embodiments of the present disclosure, the to-be-adjusted BWP includes a BWP corresponding to the activation/deactivation instruction.

In some embodiments of this disclosure, the default BWP is a BWP that is configured based on the UE;

or, the default BWP is one or more BWPs that are configured for the UE based on a serving cell of the UE.

In some embodiments of the present disclosure, the configuration module 401 is specifically configured to send the configuration information of the default BWP to the UE by using a system message, a dedicated RRC message, or an RRC reconfiguration message.

In some embodiments of the present disclosure, the RRC reconfiguration message includes one of the following messages: a secondary cell addition message, a secondary cell modification message, a secondary cell change message, a secondary cell group addition message, a secondary cell group modification message, and a secondary cell group change message.

In some embodiments of this disclosure, the default BWP is a randomly selected default BWP, a default BWP of a serving cell in which a BWP corresponding to an expired timer is located, or a default BWP selected according to a pre-configured rule.

In some embodiments of this disclosure, the pre-configured rule includes selecting a maximum default BWP in current default BWPs or selecting a minimum default BWP in current default BWPs.

Figure 5:
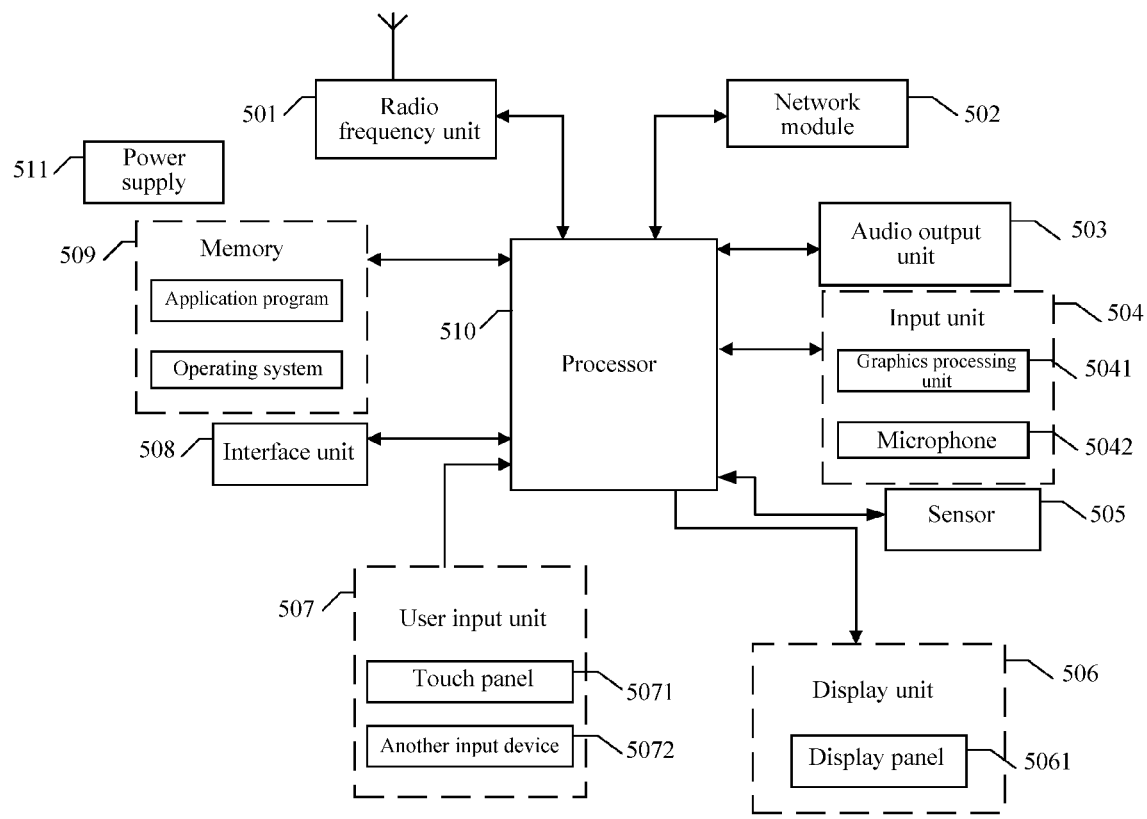
FIG. 5 is another schematic structural diagram of a mobile terminal according to an embodiment of the present disclosure.

FIG. 5 is another structural diagram of a mobile terminal for implementing the embodiments of the present disclosure. The mobile terminal includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the mobile terminal shown in FIG. 5 does not constitute a limitation on the mobile terminal, and the mobile terminal may include more or fewer components than those shown in the figure, or combine some components, or have different component arrangements. In this embodiment of the present disclosure, the mobile terminal includes but is not limited to a mobile phone, a tablet computer, a laptop computer, a palmtop computer, an in-vehicle terminal, a wearable device, a pedometer, and the like.

The processor 510 is configured to:

deactivate a currently activated BWP based on a deactivation condition and switch to a pre-configured default BWP.

The currently activated BWP includes a to-be-adjusted BWP in the currently activated BWP.

The deactivation condition includes a BWP activate/deactivate instruction, or that a timer of an activated BWP expires.

The to-be-adjusted BWP includes a BWP corresponding to the deactivation condition, and the corresponding BWP includes all currently activated BWPs.

The processor 510 is further configured to:

deactivate the corresponding BWP when a timer of an activated BWP expires and a quantity of currently activated BWPs is greater than a quantity of BWPs corresponding to the timer.

The processor 510 is further configured to:

when the deactivation condition includes that a timer of an activated BWP expires, the deactivating the currently activated BWP and switching to a pre-configured default BWP includes:

if a quantity of currently activated BWPs is equal to a quantity of BWPs corresponding to the timer, deactivate the currently activated BWP and switch to the pre-configured default BWP; and further includes:

if the quantity of currently activated BWPs is greater than the quantity of BWPs corresponding to the timer, deactivating the corresponding BWP.

The processor 510 is further configured to:

when the deactivation condition includes a BWP-based activation/deactivation instruction, the deactivating the currently activated BWP and switching to a pre-configured default BWP includes:

if a sum of a quantity of currently activated BWPs and a quantity of to-be-activated BWPs in the activation/deactivation instruction is equal to a quantity of to-be-deactivated BWPs in the activation/deactivation instruction, deactivating the currently activated BWP and switching to the pre-configured default BWP; and further includes:

if the sum of the quantity of currently activated BWPs and the quantity of to-be-activated BWPs in the activation/deactivation instruction is greater than the quantity of to-be-deactivated BWPs in the activation/deactivation instruction, deactivating the to-be-deactivated BWPs, and activating the to-be-activated BWPs.

The to-be-adjusted BWP includes a BWP corresponding to the deactivation condition, and the deactivation condition includes a BWP activation/deactivation instruction, or that a timer of an activated BWP expires.

The deactivation condition includes that a timer of an activated BWP expires, and the to-be-adjusted BWP includes all currently activated BWPs.

Or, the deactivation condition includes that a timer of an activated BWP expires, and the to-be-adjusted BWP includes a currently activated BWP that does not carry a preset service.

The default BWP is a BWP that is configured based on user equipment UE, or the default BWP is one or more BWPs that are configured for the UE based on a serving cell of the UE.

The default BWP is configured by using a system message, a dedicated RRC message, or an RRC reconfiguration message.

The RRC reconfiguration message includes one of the following messages: a secondary cell addition message, a secondary cell modification message, a secondary cell change message, a secondary cell group addition message, a secondary cell group modification message, and a secondary cell group change message.

The default BWP is a randomly selected default BWP, a default BWP of a serving cell in which a BWP corresponding to an expired timer is located, or a default BWP selected according to a pre-configured rule.

The pre-configured rule includes selecting a maximum default BWP in current default BWPs or selecting a minimum default BWP in current default BWPs.

In the technical solutions provided in the present disclosure, the currently activated BWP is first deactivated based on the deactivation condition, in other words, use of the currently activated BWP is stopped, to release some bandwidth resources. Then, the UE autonomously switches to the pre-configured default BWP. The bandwidth resources are released for other users to use the bandwidth resources properly.

It should be understood that, in this embodiment of the present disclosure, the radio frequency unit 501 may be configured to receive and send information or receive and send a signal in a call process. Specifically, after downlink data from a base station is received, the processor 510 processes the downlink data. In addition, uplink data is sent to the base station. Generally, the radio frequency unit 501 includes but is not limited to an antenna, at least one amplifier, a transceiver, a coupler, a low noise amplifier, and a duplexer. In addition, the radio frequency unit 501 may further communicate with a network and another device by using a wireless communication system.

The mobile terminal provides wireless broadband Internet access for a user by using a network module 502, for example, helping the user send and receive an email, browse a web page, and access streaming media.

The audio output unit 503 may convert audio data received by the radio frequency unit 501 or the network module 502 or stored in the memory 509 into an audio signal and output as sound. In addition, the audio output unit 503 may further provide audio output (for example, call signal receiving sound or message receiving sound) related to a specific function performed by the mobile terminal. The audio output unit 503 includes a loudspeaker, a buzzer, a telephone receiver, and the like.

The input unit 504 is configured to receive an audio signal or a video signal. The input unit 504 may include a graphics processing unit (Graphics Processing Unit, GPU) 5041 and a microphone 5042. The graphics processing unit 5041 processes image data of a static picture or a video obtained by an image capture apparatus (such as a camera) in a video capture mode or an image capture mode. A processed image frame may be displayed on the display unit 506. The image frame processed by the graphics processing unit 5041 may be stored in the memory 509 (or another computer-readable storage medium) or sent by using the radio frequency unit 501 or the network module 502. The microphone 5042 may receive sound and can process such sound into audio data. The processed audio data may be converted in a telephone call mode into a format that can be sent by the radio frequency unit 501 to a mobile communications base station for output.

The mobile terminal further includes at least one sensor 505, such as an optical sensor, a motion sensor, and another sensor. Specifically, the optional sensor includes an ambient light sensor and a proximity sensor. The ambient light sensor may adjust luminance of the display panel 5061 based on brightness of ambient light, and the proximity sensor may disable the display panel 5061 and/or backlight when the mobile terminal approaches an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include a display panel 5061, and the display panel 5061 may be configured in a form of a liquid crystal display (Liquid Crystal Display, LCD), an organic light-emitting diode (Organic Light-Emitting Diode, OLED), or the like.

The user input unit 507 may be configured to receive input digit or character information and generate key signal input related to user setting and function control of the mobile terminal. Specifically, the user input unit 507 includes a touch panel 5071 and another input device 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented by using a plurality of types such as a resistive type, a capacitive type, an infrared ray, and a surface acoustic wave. In addition to the touch panel 5071, the user input unit 507 may further include the another input device 5072. Specifically, the another input device 5072 may include but is not limited to a physical keyboard, function keys (such as a volume control key and a switch key), a trackball, a mouse, and a joystick. Details are not described herein.

Further, the touch panel 5071 may cover the display panel 5061. When the touch panel 5071 detects touch operations thereon or nearby, the touch panel 5071 transmits the touch operations to the processor 510 to determine a type of a touch event. Subsequently, the processor 510 provides corresponding visual output on the display panel 5061 according to the type of the touch event. In FIG. 5, the touch panel 5071 and the display panel 5061 are used as two independent components to implement input and output functions of the mobile terminal. However, in some embodiments, the touch panel 5071 and the display panel 5061 may be integrated to implement the input and output functions of the mobile terminal. This is not specifically limited herein.

The interface unit 508 is an interface connecting an external apparatus to the mobile terminal. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 508 may be configured to receive input (for example, data information and power) from the external apparatus and transmit the received input to one or more elements in the mobile terminal, or may be configured to transmit data between the mobile terminal and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the mobile terminal, and is connected to all parts of the entire mobile terminal by using various interfaces and lines, and performs various functions of the mobile terminal and processes data by running or executing the software program and/or the module that are stored in the memory 509 and invoking the data stored in the memory 509, to implement overall monitoring on the mobile terminal. The processor 510 may include one or more processing units. Optionally, the processor 510 may be integrated with an application processor and a modem processor. The application processor mainly processes the operating system, the user interface, application programs, and the like. The modem processor mainly processes wireless communication. It may be understood that alternatively, the modem processor may not be integrated into the processor 510.

The mobile terminal may further include a power supply 511 (such as a battery) that supplies power to each component. Optionally, the power supply 511 may be logically connected to the processor 510 by using a power management system, to implement functions such as charging, discharging, and power consumption management by using the power management system.

In addition, the mobile terminal includes some function modules not shown, and details are not described herein.

Optionally, an embodiment of the present disclosure further provides a mobile terminal, including a processor 510, a memory 509, and a computer program that is stored in the memory 509 and that can run on the processor 510. When the computer program is executed by the processor 510, each process of the foregoing bandwidth adjustment method embodiments can be implemented, and a same technical effect can be achieved. To avoid repetition, details are not described herein.

Figure 6:
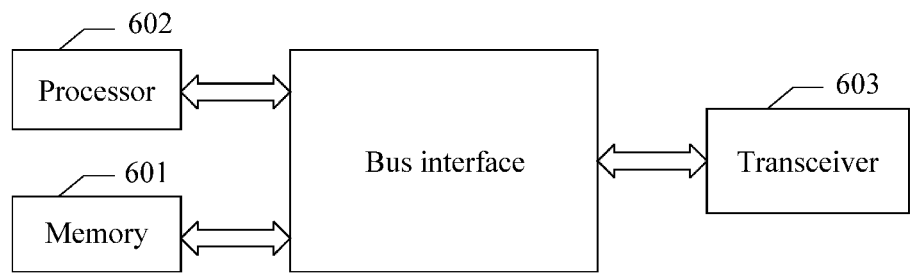
FIG. 6 is another schematic structural diagram of a network side device according to an embodiment of the present disclosure.

FIG. 6 is another structural diagram of a network side device according to an embodiment of the present disclosure, including a memory 601, a processor 602, a transceiver 603, and a computer program that is stored in the memory 601 and that can run on the processor 602.

The processor 602 is configured to:

send configuration information of a default BWP to a UE; and send a BWP-based activation/deactivation instruction to the UE, to control the UE to deactivate a currently activated BWP and switch to the default BWP, where the currently activated BWP includes a to-be-adjusted BWP in the currently activated BWP.

The to-be-adjusted BWP includes a BWP corresponding to the activation/deactivation instruction, and the corresponding BWP includes all currently activated BWPs.

The processor 602 is further configured to:

if a sum of a quantity of currently activated BWPs and a quantity of to-be-activated BWPs in the activation/deactivation instruction is equal to a quantity of to-be-deactivated BWPs in the activation/deactivation instruction, control the UE to deactivate the currently activated BWP and switch to the default BWP; and further including:

if the sum of the quantity of currently activated BWPs and the quantity of to-be-activated BWPs in the activation/deactivation instruction is greater than the quantity of to-be-deactivated BWPs in the activation/deactivation instruction, control the UE to deactivate the to-be-deactivated BWPs and activate the to-be-activated BWPs. The to-be-adjusted BWP includes a BWP corresponding to the activation/deactivation instruction.

The default BWP is a BWP that is configured based on user equipment UE, or the default BWP is one or more BWPs that are configured for the UE based on a serving cell of the UE.

The processor 602 is configured to:

send the configuration information of the default BWP to the UE by using a system message, a dedicated RRC message, or an RRC reconfiguration message.

The RRC reconfiguration message includes one of the following messages: a secondary cell addition message, a secondary cell modification message, a secondary cell change message, a secondary cell group addition message, a secondary cell group modification message, and a secondary cell group change message.

The BWP is a randomly selected default BWP, a default BWP of a serving cell in which a BWP corresponding to an expired timer is located, or a default BWP selected according to a pre-configured rule.

The pre-configured rule includes selecting a maximum default BWP in current default BWPs or selecting a minimum default BWP in current default BWPs.

In FIG. 6, a bus architecture may include any quantity of interconnected buses and bridges, which are specifically connected together by one or more processors represented by the processor 602 and various circuits of a memory represented by the memory 601. The bus architecture may further connect together various other circuits of a peripheral device, a voltage stabilizer, a power management circuit, and the like, which are known in this art and will not be further described herein. The bus interface provides an interface. The transceiver 603 may be a plurality of elements, in other words, includes a transmitter and a transceiver, and provides a unit configured to communicate with various other apparatuses on a transmission medium, and is configured to receive and send data under the control of the processor 602. The processor 602 is responsible for management on and general processing of the bus architecture. The memory 601 can store data used by the processor 602 during operation execution.

An embodiment of the present disclosure further provides a computer-readable storage medium, the computer-readable storage medium stores a computer program, and when the computer program is executed by a processor, processes of the foregoing bandwidth adjustment method embodiments are implemented, and a same technical effect can be achieved. To avoid repetition, details are not described herein. The computer-readable storage medium is, for example, a read-only memory (Read-Only Memory, ROM), a random access memory (Random Access Memory, RAM), a magnetic disk, or an optical disc.

Finally, it should be noted that the foregoing embodiments are merely used to describe the technical solutions of the present disclosure, but are not limited thereto. Although the present disclosure is described in detail with reference to the foregoing embodiments, a person of ordinary skill in the art should understand that the technical solutions recorded in the foregoing embodiments may still be modified, or some or all technical features may be equivalently replaced. However, these modifications or replacements do not make the essence of the corresponding technical solutions go beyond the scope of the technical solutions of the embodiments of the present disclosure.

The invention claimed is:

1. A bandwidth adjustment method, comprising:
    deactivating a currently activated bandwidth part BWP based on a deactivation condition, and switching to a pre-configured default BWP; wherein
    the currently activated BWP comprises a to-be-adjusted BWP in the currently activated BWP;
    wherein the deactivation condition comprises that a timer of an activated BWP expires;
    the deactivating a currently activated BWP and switching to a pre-configured default BWP comprises:
    if a quantity of currently activated BWPs is equal to a quantity of BWPs corresponding to the timer, deactivating the currently activated BWP, and switching to the pre-configured default BWP; and
    the method further comprises:
    if the quantity of currently activated BWPs is greater than the quantity of BWPs corresponding to the timer, deactivating the corresponding BWP; or
    wherein the deactivation condition comprises a BWP-based activation/deactivation instruction;
    the deactivating a currently activated BWP comprises:
    if a sum of a quantity of currently activated BWPs and a quantity of to-be-activated BWPs in the activation/deactivation instruction is equal to a quantity of to-be-deactivated BWPs in the activation/deactivation instruction, deactivating the currently activated BWP; and
    the method further comprises:
    if the sum of the quantity of currently activated BWPs and the quantity of to-be-activated BWPs in the activation/deactivation instruction is greater than the quantity of to-be-deactivated BWPs in the activation/deactivation instruction, deactivating the to-be-deactivated BWPs, and activating the to-be-activated BWPs.

2. The bandwidth adjustment method according to claim 1, wherein the to-be-adjusted BWP comprises a BWP corresponding to the deactivation condition, and the corresponding BWP comprises all currently activated BWPs.

3. The bandwidth adjustment method according to claim 1, wherein the to-be-adjusted BWP comprises a BWP corresponding to the deactivation condition, and the deactivation condition comprises a BWP activation/deactivation instruction, or that a timer of an activated BWP expires.

4. The bandwidth adjustment method according to claim 1, wherein the deactivation condition comprises that a timer of an activated BWP expires, and the to-be-adjusted BWP comprises all currently activated BWPs; or
    the deactivation condition comprises that a timer of an activated BWP expires, and the to-be-adjusted BWP comprises a currently activated BWP that does not carry a preset service.

5. The bandwidth adjustment method according to claim 1, wherein the default BWP is a BWP that is configured based on user equipment UE; or
the default BWP is one or more BWPs that are configured for the UE based on a serving cell of the UE.

6. The bandwidth adjustment method according to claim 1, wherein the default BWP is configured by using a system message, a dedicated radio resource control RRC message, or an RRC reconfiguration message.

7. The bandwidth adjustment method according to claim 6, wherein the RRC reconfiguration message comprises at least one of the following messages: a secondary cell addition message, a secondary cell modification message, a secondary cell change message, a secondary cell group addition message, a secondary cell group modification message, or a secondary cell change message.

8. The bandwidth adjustment method according to claim 1, wherein the default BWP is a randomly selected default BWP, a default BWP of a serving cell in which a BWP corresponding to an expired timer is located, or a default BWP selected according to a pre-configured rule.

9. The bandwidth adjustment method according to claim 8, wherein the pre-configured rule comprises: selecting a maximum default BWP in current default BWPs, or selecting a minimum default BWP in current default BWPs.

10. A bandwidth adjustment method, comprising:
sending configuration information of a default bandwidth part BWP to user equipment UE; and
sending a BWP-based activation/deactivation instruction to the UE, to control the UE to deactivate a currently activated BWP and switch to the default BWP, wherein the currently activated BWP comprises a to-be-adjusted BWP in the currently activated BWP;
wherein the controlling the UE to deactivate a currently activated BWP and switch to the default BWP comprises:
if a sum of a quantity of currently activated BWPs and a quantity of to-be-activated BWPs in the activation/deactivation instruction is equal to a quantity of to-be-deactivated BWPs in the activation/deactivation instruction, controlling the UE to deactivate the currently activated BWP and switch to the default BWP; and
the method further comprises:
if the sum of the quantity of currently activated BWPs and the quantity of to-be-activated BWPs in the activation/deactivation instruction is greater than the quantity of to-be-deactivated BWPs in the activation/deactivation instruction, controlling the UE to deactivate the to-be-deactivated BWPs and activate the to-be-activated BWPs.

11. The bandwidth adjustment method according to claim 10, wherein the to-be-adjusted BWP comprises a BWP corresponding to the activation/deactivation instruction, and the corresponding BWP comprises all currently activated BWPs.

12. The bandwidth adjustment method according to claim 10, wherein the default BWP is a BWP that is configured based on user equipment UE; or
the default BWP is one or more BWPs that are configured for the UE based on a serving cell of the UE; or
wherein the default BWP is a randomly selected default BWP, a default BWP of a serving cell in which a BWP corresponding to an expired timer is located, or a default BWP selected according to a pre-configured rule.

13. The bandwidth adjustment method according to claim 12, wherein the pre-configured rule comprises: selecting a maximum default BWP in current default BWPs, or selecting a minimum default BWP in current default BWPs.

14. The bandwidth adjustment method according to claim 10, wherein the sending configuration information of a default BWP to UE comprises:
sending the configuration information of the default BWP to the UE by using a system message, a dedicated radio resource control RRC message, or an RRC reconfiguration message.

15. The bandwidth adjustment method according to claim 14, wherein the RRC reconfiguration message comprises at least one of the following messages: a secondary cell addition message, a secondary cell modification message, a secondary cell change message, a secondary cell group addition message, a secondary cell group modification message, or a secondary cell change message.

16. A network side device, comprising:
a memory, configured to store a program; and
a processor, configured to run the program stored in the memory, to perform the bandwidth adjustment method according to claim 10.

17. A mobile terminal, comprising:
a memory, configured to store a program; and
a processor, configured to run the program stored in the memory, to perform:
deactivating a currently activated bandwidth part BWP based on a deactivation condition, and switching to a pre-configured default BWP; wherein
the currently activated BWP comprises a to-be-adjusted BWP in the currently activated BWP;
wherein the deactivation condition comprises that a timer of an activated BWP expires;
the processor is further configured to run the program stored in the memory, to perform:
if a quantity of currently activated BWPs is equal to a quantity of BWPs corresponding to the timer, deactivating the currently activated BWP, and switching to the pre-configured default BWP; and
the processor is further configured to run the program stored in the memory, to perform:
if the quantity of currently activated BWPs is greater than the quantity of BWPs corresponding to the timer, deactivating the corresponding BWP; or
wherein the deactivation condition comprises a BWP-based activation/deactivation instruction;
the processor is further configured to run the program stored in the memory, to perform:
if a sum of a quantity of currently activated BWPs and a quantity of to-be-activated BWPs in the activation/deactivation instruction is equal to a quantity of to-be-deactivated BWPs in the activation/deactivation instruction, deactivating the currently activated BWP; and
the processor is further configured to run the program stored in the memory, to perform:
if the sum of the quantity of currently activated BWPs and the quantity of to-be-activated BWPs in the activation/deactivation instruction is greater than the quantity of to-be-deactivated BWPs in the activation/deactivation instruction, deactivating the to-be-deactivated BWPs, and activating the to-be-activated BWPs.

18. The mobile terminal according to claim 17, wherein the default BWP is a BWP that is configured based on user equipment UE; or the default BWP is one or more BWPs that are configured for the UE based on a serving cell of the UE.

19. The mobile terminal according to claim 17, wherein the default BWP is configured by using a system message, a dedicated radio resource control RRC message, or an RRC reconfiguration message.

20. The mobile terminal according to claim 19, wherein the RRC reconfiguration message comprises at least one of the following messages: a secondary cell addition message, a secondary cell modification message, a secondary cell change message, a secondary cell group addition message, a secondary cell group modification message, or a secondary cell change message.

* * * * *